United States Patent [19]

Olson et al.

[11] Patent Number: 5,492,599
[45] Date of Patent: Feb. 20, 1996

[54] TREATED SUBSTRATE HAVING IMPROVED RELEASE PROPERTIES

[75] Inventors: Christopher C. Olson; Ramesh C. Kumar, both of Maplewood; John C. Chang, New Brighton, all of Minn.

[73] Assignee: Minnesota Mining and Manufacturing Company, St. Paul, Minn.

[21] Appl. No.: 245,651

[22] Filed: May 18, 1994

[51] Int. Cl.$^6$ .......................... D21H 17/43; D21H 17/44
[52] U.S. Cl. ....................... 162/137; 162/168.1; 162/183; 162/184; 427/208; 427/208.4; 427/208.8; 427/202; 428/352; 428/353
[58] Field of Search ..................... 162/135, 137, 162/119, 168.1, 183, 184; 427/208, 208.4, 208.8, 202, 214, 220, 41; 428/352, 354, 353

[56] References Cited

U.S. PATENT DOCUMENTS

| | | | |
|---|---|---|---|
| 2,273,040 | 2/1942 | Iler | 428/446 |
| 3,011,988 | 12/1961 | Luedke et al. | 524/553 |
| 3,022,988 | 2/1962 | Corson et al. | 432/130 |
| 3,318,852 | 5/1967 | Dixon | 428/341 |
| 3,484,271 | 12/1969 | Kaliski et al. | 428/421 |
| 3,574,791 | 4/1971 | Sherman et al. | 525/276 |
| 3,944,527 | 3/1976 | McCown | 526/243 |
| 3,949,014 | 4/1976 | Maki et al. | 525/187 |
| 4,226,749 | 10/1980 | Veaute | 524/53 |
| 4,495,029 | 1/1985 | Bergmann et al. | 162/135 |
| 4,727,055 | 2/1988 | Aoyagi et al. | 530/214 |
| 4,830,910 | 5/1989 | Larson | 428/336 |
| 4,873,140 | 10/1989 | McIntyre | 428/343 |
| 5,032,460 | 7/1991 | Kantner et al. | 428/447 |
| 5,049,416 | 9/1991 | Wilczynski | 427/208.4 |
| 5,057,619 | 10/1991 | Kumar et al. | 556/420 |
| 5,064,717 | 11/1991 | Suzuki et al. | 458/352 |
| 5,084,354 | 1/1992 | Krankkala et al. | 428/414 |
| 5,089,336 | 2/1992 | Kumar et al. | 428/352 |
| 5,141,789 | 8/1992 | Matsuzawa et al. | 428/40 |
| 5,154,962 | 10/1992 | Mertens et al. | 428/40 |
| 5,200,436 | 4/1993 | Kumar et al. | 522/57 |
| 5,202,190 | 4/1993 | Kantner et al. | 428/447 |
| 5,229,179 | 7/1993 | Kumar et al. | 428/40 |
| 5,232,997 | 8/1993 | Itoh et al. | 525/477 |
| 5,356,706 | 10/1994 | Shores | 428/352 |
| 5,382,451 | 1/1995 | Johnson et al. | 427/208.4 |

FOREIGN PATENT DOCUMENTS

| | | |
|---|---|---|
| 63075199 | 8/1993 | Japan. |
| 2040734 | 9/1980 | United Kingdom ............. B05D 1/36 |

OTHER PUBLICATIONS

Kirk–Othmer, Encyclopedia of Chemical Technology, 3rd Ed., vol. 1, pp. 1–9.
Handbook of Pressure Sensitive Adhesive Technology, Edited by Donatas Satas, 2nd Ed., pp. 595–596, Von Reinhold, New York.
Handbook of Pressure Sensitive Adhesive Technology, Donatas Satas, 2nd Ed., pp. 585–626, Von Nostrand Reinhold, New York.
Encyclopedia of Chemical Technology, Kirk–Othmer, 3rd Ed., vol. 16, pp. 803–818 and vol. 20, p. 207, & pp. 214–216, John Wiley & Sons.
The Sizing of Paper, pp. 67–73, D. R. Dill and K. A. Pollart, TAPPI Press, Atlanta (1971).

*Primary Examiner*—David L. Lacey
*Assistant Examiner*—Jose A. Fortuna
*Attorney, Agent, or Firm*—Gary L. Griswold; Walter N. Kirn; John A. Fortkort

[57] ABSTRACT

Treated cellulose-based substrate, e.g., paper, having improved release properties and methods of making such treated substrate are disclosed. The treated substrate is coated with a primer coating comprising a cationic polymer and with a release coating comprising a carboxy- or carboxylate-containing release polymer.

16 Claims, No Drawings

TREATED SUBSTRATE HAVING IMPROVED RELEASE PROPERTIES

This invention relates to treated cellulosic substrates, e.g., paper, coated with a release coating, and to methods for preparing such coated substrates.

Papers that have been coated with a release agent such as a silicone or wax, are of major commercial importance. Such release papers are important in the coated fabrics industry for use in casting or transfer coating. See, for example, Kirk-Othmer, Encyclopedia of Chemical Technology, 3rd Ed., Vol. 1, pp 1–9.

A commonly-used method for preparing papers with good release characteristics is through the use of certain chromium complexes. See, e.g., "Handbook of Pressure Sensitive Adhesive Technology," edited by Donatas Satas, 2nd Ed., pp 595–596, Van Nostrand Reinhold, New York. For example, U.S. Pat. No. 2,273,040 (Iler) describes Quilon™ Werner-type chrome complexes useful for making a variety of substrates hydrophobic, oleophilic, and softer.

U.S. Pat. No. 3,484,271 (Kaliski et al.) describes a two-step process where a polyfunctional anionic component is applied followed by treatment with a polyfunctional cationic component (Quilon™ Chrome Complex) to yield a surface adhesive to cooked food and plastic masses.

Polymers have also been used to prepare papers with good release characteristics. Such polymers include polysiloxanes, fluoropolymers, fluorosilicones, and long-chain alkyl acrylate polymers. See, e.g., "Handbook of Pressure Sensitive Adhesive Technology," edited by Donatas Satas, 2nd Ed., pp 585–626, Van Nostrand Reinhold, New York.

Japanese Examined Patent Application 63,075,199 (Kanzaki Paper) describes a water-soluble copolymer release agent for paper, with Tg of −60° to 20° C., consisting of (a) 5 to 50% of a hydrophilic ethylenically unsaturated monomer, e.g., (meth)acrylic acid or maleic acid, (b) 20 to 95% of a (meth)acrylate monomer having 4–10 carbons, e.g. butyl or hexyl, and (c) 0 to 40% of another copolymerizable monomer, e.g. vinyl acetate, styrene or acrylonitrile. The release paper has excellent threading and release properties.

Papers are also often treated with other substances such as binders or sizing coatings to impart improved properties.

U.S. Pat. No. 3,949,014 (Maki et al.) utilizes a polyamine-epichlorohydrin resin as a primary binder with a high molecular weight amphoteric polymeric compound as the secondary binder. Release properties are not mentioned.

U.S. Pat. No. 4,226,749 (Veaute) describes a sizing composition with a cationic and anionic component mixture in a clay coating formulation.

DESCRIPTION OF THE INVENTION

Briefly, in one aspect, this invention provides a method for preparing treated cellulosic substrates, e.g., paper, comprising the steps of A) first applying a water-based primer coating comprising a water-soluble or water-dispersible cationic polymer to a cellulosic substrate, followed by B) applying a water-based release coating comprising a water-soluble or water-dispersible release polymer comprising pendant carboxyl or carboxylate functional moieties, wherein said release polymer provides improved release properties to the surface of the treated substrate. Either or both of the primer coating and the release coating may further comprise a water-soluble or water-dispersible film-former in addition to the cationic polymer or release polymer. Such a film-former may decrease the porosity of the substrate, increase the substrate's strength, and improve the substrate's water resistance. While this invention is particularly useful for preparing treated paper, it is also useful with other cellulosic substrates such as cotton-based fabrics and cellulose acetate films.

In other aspect, the present invention provides a treated substrate, e.g., paper, prepared by the method of this invention.

In particular, this invention can provide low-cost treated paper which can be prepared in a simple fashion at low coating weights using a standard "on-line" paper machine treating and coating methods. The treated sheets of this invention are easily prepared on-machine, maintain their original paper appearance, and utilize a relatively low level of treatment chemical which reduces adverse effects during subsequent repulping processes.

The treated paper sheets of this invention can also show superior release properties to sheets treated with Quilon™ Chrome Complex (a chrome-stearate complex solution in isopropanol-water, available from DuPont) at releasing repositionable, permanent acrylic-, and rubber resin-based pressure sensitive adhesives, and are superior environmentally as they contain no chromium, a toxic metal which can cause waste-water contamination.

Cationic polymers useful in the primer coating of this invention includes conventionally known cationic paper additives such as cationic retention aids, crepe agents, and wet-strength resins. Such cationic polymers can be polyacrylamides, aminopolyamide-epichlorohydrin resins, polymeric amine-epichlorohydrin resins, polymeric amines, etc. For example, epichlorohydrin-modified polyamidoamine, polyethylenimine, epichlorohydrin-modified polyethylenimine, and poly(diallyldimethylammonium chloride). See, e.g., "Encyclopedia of Chemical Technology," Kirk-Othmer, 3rd Ed., Vol. 16, pp 803–818, and Vol 20, pp 207, and pp 214–216, John Wiley & Sons.

Suitable release polymers useful in the release coating of this invention contain pendant carboxylate or carboxylic acid groups:. The carboxylate or carboxylic acid groups can be a carboxylate salt, for example, the sodium salt of a carboxylic acid, or preferably the ammonium salt of a carboxylic acid, and most preferably the free acid. Such groups can be incorporated into the release polymer by polymerizing a mixture comprising acid functional monomers such as acrylic acid or methacrylic acid.

Suitable release polymers useful in the release coating of this invention contain hydrophobic groups, such as long chain alkyl, organopolysiloxane, fluoroalkyl groups, fluoroalkylene groups such as poly(perfluoroalkyleneoxy), or combinations thereof such as a fluoroalkyl polysiloxane. Such groups can be incorporated into the release polymer by polymerizing a mixture comprising monomers which contain such groups. Such polymers and monomers include many that are well known. See, e.g., the description of polysiloxane-containing monomers in U.S. Pat. Nos. 5,154,962 (Mertens et al.) and 5,032,460 (Kantner et al.), the description of long chain alkyl-containing monomers in U.S. Pat. No. 3,022,988 (Luedke et al.), and the description of fluoroalkyl-containing monomers in U.S. Pat. Nos. 3,318,852 (Dixon et al.), 4,830,910 (Larson et al.), 4,873,140 (McIntyre et al.), 3,944,527, and 3,574,791.

The release polymer can optionally contain other copolymerized monomers, such as styrene or methyl acrylate, which do not substantially contribute to its release properties but may contribute to other properties such as film formation.

Suitable release polymers include known release polymers containing carboxylic acid, and can be prepared, for example, as described in U.S. Pat. Nos. 5,032,460 (Kantner et al.), 5,057,619 (Kumar et al.), 5,089,336 (Kumar et al.), 5,200,436 (Kumar et al.), 5,202,190 (Kantner et al.), 5,229,179 (Kumar et al.), 5,232,997 (Itoh et al.), 4,761,569 (Matsuo et al.), 3,011,988 (Luedke et al.), and 3,318,852 (Dixon).

The water-soluble film-former can be any of those typically used in the paper industry, such as hydrophobically modified starch, SBR latex, polyvinyl acetate latex, gelatin, casein, and water-soluble resins such as polyvinyl alcohol and carboxymethyl cellulose. See, e.g., "The Sizing of Paper," pages 67–73, D. R. Dill and K. A. Pollart, TAPPI Press, Atlanta (1971).

The method of this invention offers potential cost savings and increase in simplicity. The treated papers of this invention can be prepared on-machine without altering the paper making process. In other words, using conventional systems such as size press or coater, dryer can cure cycles, and broke handling system. The method of this invention uses stable bath solutions. The treated paper of this invention can be prepared by sequential size presses, metering size presses, or by size press; followed by coating to produce an on-machine prepared liner. Conventional coating methods such as blade, rod, roll, air knife, etc., may be employed. In the method of this invention, the two coatings of this invention can be applied using a standard "on-line" paper machine aqueous size press or an on-line coater to convert paper to a release liner useful with pressure-sensitive adhesive tapes.

The treated papers of this invention are useful, for example, as release liners. The treated papers of this invention are useful as a pressure sensitive adhesive-containing articles such as tapes or labels. The treated paper of this invention is useful as a linerless article where the coating of this invention is on a side of the paper opposite to a side coated with adhesive, wherein the coating of this invention acts as a low-adhesion backsize.

EXAMPLES

The following nonlimiting examples shown below further describe and illustrate this invention. Procedures are given below for preparation and evaluation of the release paper samples.

In the following Examples and Comparative Examples, various release polymers were prepared to provide release characteristics to paper. These polymers were then applied to papers with or without first application of a cationic primer coating.

CATIONIC POLYMERIC PRIMERS

The following commercially available cationic polymeric primers were evaluated:

Kymene™ 557LX: polyamidoamine modified with epichlorohydrin (available from Hercules).

Crepeplus™ 75, 97: polyamidoamine modified with low epichlorohydrin content (available from Betz Paper Chemicals).

Crepetrol™ 190: polyamidoamine modified with low epichlorohydrin content (available from Hercules).

PEI: polyethylenimine, mol. wt. 50,000–60,000, 50% (wt) in water (available from Aldrich Chemical Co.).

PEI-E: polyethylenimine modified with epichlorohydrin, base polymer mol. wt. 20,000, 17% (wt) in water (available from Aldrich Chemical Co.).

Polymin™ PR971L: high charge density, high molecular weight polyethylenimine (available from BASF).

Polymin™ SNA: modified high molecular weight polyethylenimine (available from BASF).

Agefloc™ WT-20VHV: poly(dimethyldiallylammonium chloride) (available from CPS Chemical).

SYNTHESIS OF RELEASE POLYMERS

The following monomers were used to prepare release polymers:

| Fluoroalkyl Monomers | |
|---|---|
| MeFOSEA = | $C_8F_{17}SO_2N(CH_3)CH_2CH_2OC(O)CH=CH_2$ (available from 3M) |
| MeFOSEMA = | $C_8F_{17}SO_2N(CH_3)CH_2CH_2OC(O)C(CH_3)=CH_2$ (available from 3M) |
| BuFOSEA = | $C_8F_{17}SO_2N(C_4H_9)CH_2CH_2OC(O)CH=CH_2$ (available from 3M) |
| Telomer-A = | $C_8F_{17}CH_2CH_2OC(O)CH=CH_2$ (made by reacting Zonyl™ BA, fluoroalkyl alcohol available from DuPont, with acryloyl chloride) |
| Organopolysiloxane Monomers | |
| X-22-164B = | Methacryl-modified silicone (available from Shin-Etsu) |
| KF-2001 = | Mercapto-functional silicone (available from Shin-Etsu) |
| Hydrocarbon Monomers | |
| MA = | $CH_3OC(O)CH=CH_2$ |
| MMA = | $CH_3OC(O)C(CH_3)=CH_2$ |
| BA = | $n-C_4H_9OC(O)CH=CH_2$ |
| EHA = | $C_4H_9CH(C_2H_5)CH_2OC(O)CH=CH_2$ |
| LA = | $C_{12}H_{25}OC(O)CH=CH_2$ |
| LMA = | $C_{12}H_{25}OC(O)C(CH_3)=CH_2$ |
| ODA = | $C_{18}H_{37}OC(O)CH=CH_2$ |
| ODMA = | $C_{18}H_{37}OC(O)C(CH_3)=CH_2$ |
| N-MAM = | $HOCH_2NHC(O)CH=CH_2$ (48 wt % aqueous solution) |
| ST = | styrene |
| GMA = | glycidyl methacrylate |
| Anionic monomers | |
| AA = | $CH_2=CHCOOH$ |
| MAA = | $CH_2=C(CH_3)COOH$ |
| BCEA = | $CH_2=CHC(O)OCH_2CH_2COOH$ |
| ICA = | $CH_2=C(COOH)_2$ |
| AMPS = | $CH_2=CHC(O)N(H)C(CH_3)_2SO_3H$ (available from Polyscience, Inc.) |
| SSS = | sodium styrene sulfonate (available from DuPont) |
| PHOS = | $CH_2=CHC(O)OCH_2CH_2OP(O)(OH)_2$ (available from Nippon Oil |

& Fats)

POLYMER P1

Into a 16-oz (500 mL) narrow mouth glass bottle were charged 18.2 g of MA, 45.5 g of MMA, 9.1 g of MAA, 27.3 g of KF-2001, 0.25 g of 2,2'-azobisisobutyronitrile (available from DuPont as Vazo™ 64 initiator) and 150 g of methyl ethyl ketone (MEK). The resulting clear solution was purged with nitrogen for 2 minutes at a rate of 1 L/min, after which the bottle was sealed with a screw cap and was tumbled for 48 hours in a Launder-o-meter™ laboratory reactor set at 55° C. A clear, viscous polymer solution resulted which was approximately 40% (wt) solids.

To obtain a water-borne polymer dispersion, 360 g of deionized water and 2.57 g of concentrated NH$_4$OH were first added to a 1-L reaction flask equipped with stirrer and thermometer. While stirring, 100 g of the polymer solution prepared above was added slowly until the initial milky dispersion became homogeneous. The resulting solution was stirred for ½ hour, then MEK was stripped off using a Rotovapor-R™ evaporator (available from Buchi) to obtain a 10% (wt) solids aqueous polymer solution.

POLYMER P2

The procedure used to make polymer P1 was repeated, except the following charges were used: MA (130 g), MMA (52 g), MAA (13 g), KF-2001 (65 g), Vazo™ 64 initiator (0.65 g) and[MEK (390 g). A viscous, slightly yellow solution resulted, containing 39% (wt) solids. To obtain a water-borne polymer dispersion, 528 g of deionized water and 4.64 g of concentrated NH$_4$OH were mixed in a 1-liter reaction flask. To this solution was added with stirring 340 g of the polymer solution prepared above. The resultant milky solution was stirred for ½ hour, then the MEK was stripped off to obtain a 22.3% (wt) solids polymer solution.

POLYMER P3

The procedure used to make polymer P1 was repeated, except the following charges were used: MA (61 g), AA (46 g), KF-2001 (18 g), Vazo™ 64 initiator (0,315 g) and MEK (187.5 g). A milky, viscous solution resulted, to which 20 g of iso-propyl alcohol (IPA) was added to decrease the viscosity of the solution. (No post-emulsification in water was done.) The resulting polymer solution was 35% (wt) solids in MEK-IPA.

POLYMER P4

The following components were charged into a 1-quart narrow mouth glass bottle: 132.8 g of ODA (as 61.6% solids in EtOAc), 17.6 g of MA, 40.0 g of MMA, 20.8 g of AA, 0.48 g of Vazo™ 64 initiator, 103.2 g of ethyl acetate (EtOAc), 150.4 g of t-butyl alcohol and 136.8 g of toluene. The mixture was purged with nitrogen for 2 minutes at a rate of 1 L/min, after which the bottle was sealed with a screw cap and was tumbled for 60 hours in Launder-o-meter™ laboratory reactor set at 55° C. The resulting polymer solution was 27% (wt) solids. To obtain a water-borne dispersion, 535 g of deionized water and 8.4 g of concentrated NH$_4$OH were first added to a 1-L reaction flask equipped with stirrer and thermometer. While stirring, 220 g of the polymer solution prepared above was added slowly until the initial milky solution became homogeneous. The resulting solution was stirred for ½ hour, then the MEK was stripped off to obtain a 9.8% (wt) solids polymer solution.

POLYMER P5

The same procedure was used as for preparing polymer P4, except the following charges were used: ODA (143.2 g, as 61.6% solids in EtOAc), MA (16.0 g), MMA (36.8g), AA (19.2 g, Vazo™ 64 initiator (0.48 g), EtOAc (99.2 g), t-butyl alcohol (150.4 g) and toluene (136.8 g). The resulting polymer solution was 26.8% (wt) solids.

To obtain a water-borne dispersion, 535 g of deionized water and 8.0 g of concentrated NH$_4$OH were first added to a 1-L reaction flask equipped with stirrer and thermometer. While stirring, 220 g of the polymer solution prepared above was added slowly until the initial milky solution became homogeneous. The resulting solution was stirred for ½ hour, then the MEK was stripped off to obtain a 9.7% (wt) solids release polymer solution.

POLYMER P6

The same procedure was used as for preparing polymer P4, except the following charges were used: ODA (152.8 g, as 61.6% solids in EtOAc), MA (14.4 g), MMA (33.6 g), AA (17.6 g), Vazo™ 64 initiator (0.48 g), EtOAc ( 96.0 g), t-butyl, alcohol ( 150.4 g) and toluene (136.8 g). The resulting polymer solution was 26.8% (wt) solids.

To obtain a water-borne dispersion, 535 g of deionized water and 7.6 g of concentrated NH$_4$OH were first added to a 1-L reaction flask equipped with stirrer and thermometer. While stirring, 220 g of the polymer solution prepared above was added slowly until the initial milky solution became homogeneous. The resulting solution was stirred for ½ hour, then the MEK was stripped off to obtain a 9.7% (wt) solids release polymer solution.

POLYMER P7

To a 16 oz (500 mL) narrow-mouth glass bottle, MeFO-SEA (37.3 g), LA (18.7 g), AA (8.0 g), KF-2001 (16.0.g), Siponate™ DS-10 emulsifier (2.4 g, available from Rhone-Poulenc) and Zonyl™ FSP fluorosurfactant (1.2 g, available from DuPont) were added and allowed to melt together at 55° C. After adding 245 g of deionized water preheated to 55° C. and 60 g of acetone, the contents were homogenized to an emulsion using an ultrasonic homogenizer. Then potassium persulfate (0.24 g) was added with mixing, the emulsion was degassed using vacuum, and the emulsion was heated under nitrogen atmosphere at 65° C. for 16 hours using Launder-O-Meter™ Laboratory Reactor. The resulting latex was filtered to obtain a 27.2% (wt) solids aqueous dispersion of the desired polymer.

POLYMER p8

To a 16 oz (500 mL) narrow-mouth glass bottle, MeFO-SEA (40.0 g), LA (20.0 g), AA (4.0 g), KF-2001 (16.0 g), Siponate™ DS-10 emulsifier (2.4 g) and Zonyl™ FSP fluorosurfactant (1.2 g) were added and allowed to melt together at 85° C. After adding 240 g of deionized water preheated to 85° C., the contents were homogenized to an emulsion using an ultrasonic homogenizer. Then potassium persulfate (0.24 g) was added with mixing, the emulsion was degassed using vacuum, and the emulsion was heated under nitrogen atmosphere at 75° C. for 16 hours using Launder-O-Meter™ Laboratory Reactor. The resulting latex was filtered to obtain a 24.9% by weight aqueous dispersion of the desired polymer.

POLYMER P9

The same procedure was followed as for making Polymer P8 except that the following charges were used: MeFOSEA (34.4 g), LA (17.6 g), AA (12.0 g) and KF-2001 (16.0 g). The resulting latex was filtered to obtain a 23.6% by weight aqueous dispersion of the desired polymer.

POLYMER P 10

The same procedure was followed as for making polymer P8 except that the following charges were used: MeFOSEA (32.0 g), LA (14.4 g), AA (17.6 g) and KF-2001 (16.0 g). The resulting latex was filtered to obtain a 24.9% by weight aqueous dispersion of the desired polymer.

POLYMER P11

Polymer P11 was prepared as in the preparation of polymer P8 except using a monomer mixture of 40.0 g MeFOSEA, 24.0 g LA, and 16.0 g KF-2001. The resulting latex was filtered to obtain a 23.4% by weight aqueous dispersion of the desired polymer.

POLYMER P12

To an 8 oz (250 mL) narrow-mouth glass bottle, MeFOSEA (24 g), LA (12 g), AA (4 g), Siponate™ DS-10 emulsifier (1.2 g) and Zonyl™ FSP fluorosurfactant (0.6 g) were added and allowed and melted together at 75° C. After adding 120 g of deionized water preheated to 75° C. the contents were homogenized to an emulsion using an ultrasonic homogenizer. Then potassium persulfate (0.12 g) was added with mixing, the emulsion was degassed using vacuum and was heated under nitrogen atmosphere at 75° C. for 16 hours. The resulting latex was filtered to obtain a 23.7% by weight aqueous dispersion of the desired polymer.

POLYMER P13

Polymer P13 was prepared as in Polymer P12 except that 0.2 g of n-dodecylmercaptan was added as a chain transfer agent.

POLYMERS P14–P36

As shown in Table 1, release polymers P14–P36 were prepared using the same procedure as with release polymer P12, except that the monomer mixtures used were those summarized in Table 1.

TABLE 1

| Polymer | Fluoroalkyl Hydrophobic Monomer, (g) | Non-Fluoroalkyl Hydrophobic Monomer, (g) | Anionic Monomer (g) |
|---|---|---|---|
| P14 | MeFOSEA, 22 | LA, 12 ODA, 2 | AA, 4 |
| P15 | MeFOSEMA, 24 | LA, 12 | AA, 4 |
| P16 | BuFOSEA, 24 | LA, 12 | AA, 4 |
| P17 | Telomer-A, 24 | LA, 12 | AA, 4 |
| P18 | MeFOSEA, 24 | ODMA, 12 | AA, 4 |
| P19 | MeFOSEA, 24 | ODA, 12 | AA, 4 |
| P20 | MeFOSEA, 24 | LMA, 12 | AA, 4 |
| P21 | MeFOSEA, 24 | ST, 12 | AA, 4 |
| P22 | MeFOSEA, 24 | EHA, 12 | AA, 4 |
| P23 | MeFOSEA, 24 | BA, 12 | AA, 4 |
| P24 | MeFOSEA, 29.2 | LA, 7.2 N-MAM, 2.8 (as 48% sol'n) | AA, 0.8 |
| P25 | MeFOSEA, 29.2 | LA, 7.2 GMA, 2.8 | AA, 0.8 |
| P26 | — | LA, 12 X-22-164B, 24 | AA, 4 |
| P27 | MeFOSEA, 12 | LA, 12 X-22-164B, 12 | AA, 4 |
| P28 | MeFOSEA, 36 | — | AA, 4 |
| P29 | — | LA, 36 | AA, 4 |
| P30 | MeFOSEA, 24 | LA, 12 | MAA, 4 |
| P31 | MeFOSEA, 24 | LA, 12 | BCEA, 4 |
| P32 | MeFOSEA, 24 | LA, 12 | ICA, 4 |
| P33 | MeFOSEA, 24 | LA, 12 | AMPS, 4 |
| P34 | MeFOSEA, 24 | LA, 12 | SSS, 4 |
| P35 | MeFOSEA, 24 | LA, 12 | PHOS, 4 |
| P36 | MeFOSEA, 24 | LA, 16 | — |

Preparation Of Coating Solutions

Primer or release coatings were prepared by mixing cationic primer or release polymer solutions with deionized water as specified in the particular example.

If optional film former was to be included, then prior to mixing with either a cationic primer or release polymer solution, deionized water was charged into a 1.5 L, stainless steel, steam-heated vessel followed by addition of 3% by weight of a film-forming sizing agent such as Film-Kote™ 54 starch (a hydrophilic hybrid corn starch available from National Starch and Chemical Co.), Penford™ Gum 240 starch (available from Penford Products Co.), Elvanol™ 71–30 or Elvanol™ HV polyvinyl alcohol (both available from DuPont). The film-former and water mixture was heated for 30 minutes at 93° C. (200° F.) with stirring and allowed to cool to ambient temperature before use.

Preparation of Treated Papers

The paper used for the following Examples and Comparative Examples were sheets of paper base stock, not pre-sized and consisting of a highly refined bleached substrate of basis weight of 59 g/m$^2$ (36 lb/3000 ft$^2$). The sheets were treated with cationic primer solution using a laboratory size press consisting of a single nip padder operating at 4.6 m/min (15 ft/min) and using a nip pressure of 1030 torr (20 psi). The wet cationic primer-treated paper was dried using a Johnke™ Drum Dryer twice heated to 77° C. (170° F.) for 30 seconds. The release polymer solution was then applied and dried in the same way as the cationic primer solution, except that drying was done at 110° C. (230° F.) instead of 77° C. (170° F.). The % SOF (percent solids base( on fiber) was calculated based on the wet treating solution pick-up of the paper, which typically was about 50%, and the % by weight of the polymer in the treating solution or bath.

Test Methods For Evaluating Treated Papers

Release to pressure-sensitive adhesive tape was measured using a "peel force" test. In this test, a 1.9 cm (0.75 inch) wide by 20 cm (8 inch) long strip of pressure sensitive adhesive tape was dry-laminated by hand to the treated paper and was secured with two passes of a 2 kg rubber roller of 5.1 cm (2 inch) width and 1.98 cm (0.75 inch) diameter. The peel force to remove the tape from the paper at an angle of 180° and at a peel rate of 229 cm/min (90 in/min) was then measured using an IMASS™ SP-102B-3M90 peel tester (available from Instrumentors Inc.). Peel force was measured on one sample ½ hour after preparation ("Initial") and, in most cases, on another sample after aging for two days at 65° C. (150° F.) and ambient humidity using a forced air oven followed by cooling for ½ hour at 50% humidity ("Aged"). Tapes used were 3M Magic™ tape #810, 3M Magic™ tape #610, and Johnson & Johnson Zonis™ tape.

EXAMPLES 1–15 and COMPARATIVE EXAMPLES C1–C8

In Examples 1–15 and Comparative Examples C1 to C3, treated papers were prepared and tested using the methods described above. Silicone-based release polymers P1–P3 were evaluated as release coatings. Examples 1–15 used five different cationic primers and silicone-based release polymers P1 to P3. Each primer was coated at 1.0% SOF from a Film-Kote™ 54 aqueous solution, and each release polymer was coated at 1.0% SOF from deionized water. Comparative Examples C4–C8 used the primers coated at 1.0% SOF but with no release polymer. Comparative Examples C1–C3 used the release polymers coated at 1.0% SOF from deionized water, but with no cationic primer. 3M Magic™ tape #810 was used for all peel force measurements. The compositions and test results are summarized in Table 2.

TABLE 2

| Ex. | Cationic Primer | Release Polymer | Peel Force, N/m (oz/inch) Initial | Aged |
|---|---|---|---|---|
| 1 | Kymene ™ 557LX | P1 | 23 (2.1) | 210 (19) |
| 2 | Crepeplus ™ 75 | P1 | 36 (3.2) | 180 (16) |
| 3 | Crepeplus ™ 97 | P1 | 36 (3.2) | 140 (13) |
| 4 | PEI | P1 | 22 (2.0) | 110 (10) |
| 5 | PEI-E | P1 | 33 (3.0) | 180 (16) |
| C1 | — | P1 | * | * |
| 6 | Kymene ™ 557LX | P2 | 11 (0.97) | 110 (9.7) |
| 7 | Crepeplus ™ 75 | P2 | 54 (4.9) | 160 (14) |
| 8 | Crepeplus ™ 97 | P2 | 33 (3.0) | 130 (12) |
| 9 | PEI | P2 | 31 (2.8) | 100 (9.0) |
| 10 | PEI-E | P2 | 10 (0.92) | 120 (11) |
| C2 | — | P2 | 140 (13) | * |
| 11 | Kymene ™ 557LX | P3 | 90 (8.1) | * |
| 12 | Crepeplus ™ 75 | P3 | 160 (14) | 290 (26) |
| 13 | Crepeplus ™ 97 | P3 | 140 (13) | 290 (26) |
| 14 | PEI | P3 | 62 (5.6) | 180 (16) |
| 15 | PEI-E | P3 | 97 (8.7) | * |
| C3 | — | P3 | * | * |
| C4 | Kymene ™ 557LX | — | 240 (22) | — |
| C5 | Crepeplus ™ 75 | — | * | * |
| C6 | Crepeplus ™ 97 | — | * | * |
| C7 | PEI | — | * | * |
| C8 | PEI-E | — | 300 (27) | * |

*The paper substrate ripped when running the peel force test

The data in Table 2 show that silicone-based release polymers P1–P3 provided coated papers with much lower peel force values when a cationic primer was first applied. Polymers P1 and P2, with higher silicone levels than polymer P3, gave lower peel force values. When primers were used with no release polymer, high peel force values resulted or the paper substrate ripped during testing.

EXAMPLES 16–24 and COMPARATIVE EXAMPLES C9–C11

In Examples 16–24, treated papers were prepared and tested as in Examples 1–15 using varying amounts of Kymene™ 557LX cationic primer and silicone-based release polymer P1. The primer was coated from a Film-Kote™ 54 starch aqueous solution, and release polymer P1 was coated from deionized water. In Comparative Examples C9–C11, release polymer P1 was coated from deionized water but no cationic primer was used. 3M Magic™ tape #810 was used for all peel force measurements. The % SOF of cationic primer, % SOF of release polymer P1, and the test results are summarized in Table 3.

TABLE 3

| Ex. | Kymene ™ 557LX (% SOF) | Polymer P1 (% SOF) | Peel Force, N/m (oz/inch) Initial | Aged |
|---|---|---|---|---|
| 16 | 2.0 | 0.5 | 17 (1.5) | 130 (12) |
| 17 | 1.0 | 0.5 | 37 (3.3) | 240 (22) |
| 18 | 0.5 | 0.5 | 49 (4.4) | 270 (24) |
| C9 | — | 0.5 | 92 (8.3) | * |
| 19 | 2.0 | 1.0 | 12 (1.1) | 160 (14) |
| 20 | 1.0 | 1.0 | 23 (2.1) | 210 (19) |
| 21 | 0.5 | 1.0 | 19 (1.7) | * |
| C10 | — | 1.0 | 53 (4.8) | * |
| 22 | 2.0 | 2.0 | 18 (1.6) | 95 (8.6) |
| 23 | 1.0 | 2.0 | 13 (1.2) | 105 (9.5) |
| 24 | 0.5 | 2.0 | 16 (1.4) | 105 (9.5) |
| C11 | — | 2.0 | 46 (4.1) | * |

*The paper substrate ripped when running the peel strength test

The data in Table 3 show that in the Comparative Examples, when no cationic primer was used, the paper ripped when peel force measurements were taken after oven aging. The compositions of this invention, comprising both a silicone-based release polymer and cationic primer, gave low peel force values at levels down to 0.5% SOF of each coating.

EXAMPLES 25–30

In Examples 25–30, treated papers were prepared and tested as described above using various film-formers at 3% (wt) concentration in the Kymene™ 557LX cationic primer solution. The film-formers used were Elvanol™ 71-30, Penford™, Gum 240, and Film Kote™ 54. Silicone-based release polymers P1 and P2 were coated from deionized water. In all cases, primer and release polymers were applied at 1% SOF. 3M Magic™ tape #810 was used for all peel force measurements. The compositions and test results are summarized in Table 4.

TABLE 4

| Ex. | Release Polymer | Film-former | Peel Force, N/m (oz/inch) Initial | Aged |
|---|---|---|---|---|
| 25 | P1 | Elvanol ™ 71-30 | 23 (2.1) | 140 (13) |
| 26 | P1 | Penford ™ Gum 240 | 17 (1.5) | 120 (11) |
| 27 | P1 | Film Kote ™ 54 | 17 (1.5) | 160 (14) |
| 28 | P2 | Elvanol ™ 71-30 | 12 (1.1) | 130 (12) |
| 29 | P2 | Penford ™ Gum 240 | 7.4 (0.67) | 120 (11) |
| 30 | P2 | Film Kote ™ 54 | 7.6 (0.69) | 120 (11) |

The data in Table 4 show that different film-formers can be used in this invention.

EXAMPLES 31–33 AND COMPARATIVE EXAMPLES C12–C14

In Examples 31–33, treated papers were prepared and tested as described above using Kymene™ 557LX cationic primer and long chain hydrocarbon-based release polymers P4 to P6, each coated at 1.0% SOF from deionized water. The paper used was the same as described in the "Preparation of Release Papers" section except that the paper was pre-sized with polyvinyl alcohol and was machine calendered. In Comparative Examples C12–C14, treated papers were prepared and tested as in Examples 31–33 except no primer was used. The compositions and test results are summarized in Table 5. 3M Magic™ tape #810 was used for all peel force measurements.

TABLE 5

| Ex. | Cationic Primer | Release Polymer | Peel Force, N/m (oz/inch) Initial | Aged |
|---|---|---|---|---|
| 31 | Kymene ™ 557LX | P4 | 63 (5.7) | 650 (59) |
| C12 | — | P4 | 260 (23) | Not Run |
| 32 | Kymene ™ 557LX | P5 | 38 (3.4) | 470 (42) |
| C13 | — | P5 | 230 (21) | Not Run |
| 33 | Kymene ™ | P6 | 28 (2.5) | 610 (55) |

TABLE 5-continued

| Ex. | Cationic Primer | Release Polymer | Peel Force, N/m (oz/inch) Initial | Aged |
|---|---|---|---|---|
| C14 | 557LX — | P6 | 240 (22) | Not Run |

The data in Table 5 show that the cationic primer lowered the peel force values of the long chain hydrocarbon-based release polymers, though these values increased after oven aging.

EXAMPLES 34–37 and COMPARATIVE EXAMPLES C15–C18

In Examples 34–37, treated papers were prepared and tested as in Example 1 using Kymene™ 557LX cationic primer and fluorochemically modified silicone-based release polymer P7. Each was coated from a Film-Kote™ 54 starch aqueous solution, the primer at 1.0% SOF and release polymer P7 at either 1% or 2% SOF. In Comparative Examples C15–C18, treated papers were prepared and tested as in Examples 34–37 except that no primer was used. 3M Magic™ tapes #810 and #610 were used for the peel force measurements. The compositions and test results are summarized in Table 6.

TABLE 6

| Ex. | Kymene™ 557LX (% SOF) | Polymer P7 (% SOF) | 3M Magic™ Tape Used | Peel Force, N/m (oz/inch) Initial | Aged |
|---|---|---|---|---|---|
| 34 | 1.0 | 1.0 | #810 | 3.9 (0.35) | 18 (1.5) |
| 35 | 1.0 | 2.0 | #810 | 3.3 (0.3) | 13 (1.2) |
| C15 | — | 1.0 | #810 | 20 (1.8) | 62 (5.6) |
| C16 | — | 2.0 | #810 | 11 (1.0) | 31 (2.8) |
| 36 | 1.0 | 1.0 | #610 | 18 (1.6) | 91 (8.2) |
| 37 | 1.0 | 2.0 | #610 | 4.1 (0.37) | 46 (4.1) |
| C17 | — | 1.0 | #610 | 87 (7.8) | 200 (18) |
| C18 | — | 2.0 | #610 | 37 (3.3) | 140 (13) |

The data in Table 6 show that when fluorochemically modified silicone-based release polymer P7 was used with a cationic primer, low peel force values were attained with each type of tape, initially and after aging. The Comparative Examples, with no cationic primer, showed low peel force values but two to three times higher than those of the Examples.

EXAMPLES 38–41 and COMPARATIVE EXAMPLES C19–C21

In Examples 38–41, treated papers were prepared and tested as described in Example 1 using Kymene™ 557LX cationic primer and fluorochemically modified silicone-based release polymers P7–P10, which contained varying amounts of copolymerized acrylic acid. Both the primer and release polymers were coated at 1.0% SOF from a Film-Kote™ 54 starch aqueous solution. In Comparative Example C19, treated papers were prepared and tested as described in Examples 38–41 except that polymer 11, a fluorochemically modified siloxane polymer containing no acrylic acid, i.e. having no anionic moieties, was used. In Comparative Example C20, treated papers were prepared and tested as described in Example 1 except using Quilon™ C Chrome Complex (available from DuPont) as the release coating, applied at 1% SOF from an Elvanol™ 71–30 polyvinyl alcohol aqueous solution, and without primer. In Comparative Example C21, treated papers were prepared and tested as described in Comparative Example C20 except that Aerosol™ 22 surfactant (available from American Cyanamid) an anionic component, was used as a primer at 1% SOF from an Elvanol™ 71–30 polyvinyl alcohol aqueous solution, as prescribed in U.S. Pat. 3,484,271. 3M Magic™ tape #810 was used for all peel force measurements. Compositions and test results are summarized in Table 7.

TABLE 7

| Ex. | Release polymer or system | Peel Force, N/m (oz/inch) Initial | Aged |
|---|---|---|---|
| 38 | P8 | 4.8 (0.43) | 28 (2.5) |
| 39 | P7 | 3.9 (0.35) | 18 (1.6) |
| 40 | P9 | 2.3 (0.21) | 19 (1.7) |
| 41 | P10 | 3.8 (0.34) | 32 (2.9) |
| C19 | P11 | 8.9 (0.80) | 75 (6.8) |
| C20 | Quilon™ C | 20 (1.8) | 90 (8.1) |
| C21 | Aerosol™ 22 and Quilon™ C | 11 (1.0) | 63 (5.7) |

The data in Table 7 show that the presence of carboxylic moieties in the fluorochemically modified silicone-based release polymers was necessary to achieve very low peel force values. Comparative Example C19 used release polymer P11, which contains no copolymerized acrylic acid, and produced treated papers with higher peel forces than the Examples of this invention. The fluorochemically modified silicone-based release polymers of this invention produced treated papers with lower peel forces than chromium stearate Werner complex-based paper treatment used either alone or with the anionic primer.

EXAMPLES 42–47 and COMPARATIVE EXAMPLE C22

In Examples 42–47, treated papers were prepared and tested as described in Example 1 using Kymene™ 557LX cationic primer and release polymer P12, a terpolymer of a fluoroacrylate, a long chain hydrocarbon acrylate, and acrylic acid. Each was coated from an Elvanol™ HV polyvinyl alcohol aqueous solution at the indicated % SOF. In Comparative Example C22, treated papers were prepared and tested as described in Examples 42–47 using polymer P12 with no cationic primer. 3M Magic™ tape #810 was used for all peel force measurements. Compositions and test results are summarized in Table 8.

TABLE 8

| Ex. | Kymene™ 557LX (% SOF) | Polymer P12 (% SOF) | Peel Force, N/m (oz/inch) Initial | Aged |
|---|---|---|---|---|
| 42 | 0.1 | 1.0 | 16 (1.4) | 74 (6.7) |
| 43 | 0.5 | 1.0 | 10 (0.9) | 61 (5.5) |
| 44 | 1.0 | 1.0 | 10 (0.9) | 49 (4.4) |
| 45 | 2.0 | 1.0 | 6.7 (0.6) | 40 (3.6) |
| 46 | 1.0 | 0.5 | 18 (1.6) | 120 (11) |
| 47 | 1.0 | 2.0 | 9 (0.8) | 46 (4.1) |
| C22 | — | 1.0 | 22 (2.0) | 89 (8.0) |

The data in Table 8 show that when the fluoroacrylate terpolymer was used with the cationic primer, low peel force values were measured, before and after oven aging. When no cationic primer was used, peel force values were about twice as high.

EXAMPLES 48–51 and COMPAPARATIVE EXAMPLE C23

In Examples 48–51, treated papers were prepared and tested as described in Example 1 using a variety of cationic primers and fluoroalkyl release polymer P14, coating both at 1.0% SOF from an Elvanol™ HV polyvinyl alcohol aqueous solution. In Comparative Example C23, treated papers were prepared and tested as described in Examples 48–51 except that no cationic primer was used. M Magic™ tape #810 was used for all peel force measurements. Compositions and test results are summarized in Table 9.

TABLE 9

| Ex. | Cationic Primer | Peel Force, N/m (oz/inch) | |
|---|---|---|---|
| | | Initial | Aged |
| 48 | Agefloc™ WT-20VHV | 10.3 (0.93) | 72 (6.5) |
| 49 | Crepetrol™ 190 | 39 (3.5) | 160 (14) |
| 50 | Polymin™ SNA | 10.4 (0.94) | 52 (4.7) |
| 51 | Polymin™ PR971L | 9.2 (0.83) | 48 (4.3) |
| C23 | — | 54 (4.9) | 170 (15) |

The data from Table 9 show that each of the cationic primers reduced peel force values when used with polymer P13 compared to the release polymer without cationic primer.

EXAMPLES 52–68

In Examples 52–68, treated papers were prepared and tested as in Example 1 using release polymer P12 and polymers P14 to P30. In all cases, the cationic primer (Kymene™ 557LX) and release polymer were each applied at 1.0% SOF from Elvanol™ HV polyvinyl alcohol aqueous solution. 3M Magic™ tape #810 was used for all peel force measurements. Compositions and test results are summarized in Table 10.

TABLE 10

| Ex. | Release Polymer | Hydrophobic Monomers in Polymer | Peel Force, N/m (oz/inch) | |
|---|---|---|---|---|
| | | | Initial | Aged |
| 52 | P12 | MeFOSEA, LA | 13 (1.2) | 50 (4.5) |
| 53 | P13 | MeFOSEA, LA* | 8.1 (0.73) | 38 (3.4) |
| 54 | P15 | MeFOSEMA, LA | 14 (1.3) | 87 (7.8) |
| 55 | P16 | BuFOSEA, LA | 57 (5.1) | 200 (18) |
| 56 | P17 | Telomer-A, LA | 23 (2.1) | 130 (12) |
| 57 | P18 | MeFOSEA, ODMA | 13 (1.2) | 71 (6.4) |
| 58 | P19 | MeFOSEA, ODA | 16 (1.4) | 77 (7.0) |
| 59 | P20 | MeFOSEA, LMA | 11 (1.0) | 60 (5.4) |
| 60 | P21 | MeFOSEA, ST | 54 (4.9) | 300 (27) |
| 61 | P22 | MeFOSEA, EHA | 28 (2.5) | 130 (12) |
| 62 | P23 | MeFOSEA, BA | 52 (4.7) | 280 (25) |
| 63 | P24 | MeFOSEA, LA, N-MAM | 11 (0.99) | 55 (5.0) |
| 64 | P25 | MeFOSEA, LA, GMA | 14 (1.3) | 63 (5.7) |
| 65 | P26 | X-22-164B, LA | 40 (3.6) | 260 (23) |
| 66 | P27 | X-22-164B, MeFOSEA | 18 (1.6) | 160 (14) |
| 67 | P28 | MeFOSEA | 19 (1.7) | 100 (9.0) |
| 68 | P29 | LA | 53 (4.8) | 280 (25) |

*Contains n-$C_{12}H_{25}SH$ as chain transfer agent

The data in Table 10 show that low peel force values were attained through many variations in the hydrophobic monomers. Exceptionally low peel force values were attained when combinations of fluoroalkyl and long chain hydrocarbon groups were used in the polymer. Polymers P26 and P29, prepared using silicone and/or long chain hydrocarbon monomers but no fluoroalkyl monomer, gave higher peel force values than most of the release polymers containing polymerized fluoroacrylate monomer.

EXAMPLES 69–71 AND COMPARATIVE EXAMPLES C24–C28

In Examples 69–71, treated papers were prepared and tested as in Example 1 using polymers P12, P30, and P31, each containing interpolymerized units derived from ethylenically unsaturated monocarboxylic-functional monomers. In Comparative Examples C24–C27, treated papers were prepared and tested as in Example 1 using polymers P32–P35, containing interpolymerized units derived from ethylenically unsaturated dicarboxylic-functional monomer, sulfonic acid-functional monomer, or phosphonic acid-functional monomer. In Comparative Example C28, treated papers were prepared and tested as in Example 1 using polymer P36, which does not contain interpolymerized units derived from an anionic-functional monomer. In all cases, the cationic primer (Kymene™ 557LX) and release polymer were each applied at 1.0% SOF from an Elvanol™ HV polyvinyl alcohol aqueous solution 3M Magic tape ™ #810 was used for all peel force measurements. Compositions and test results and summarized in Table 11.

TABLE 11

| Ex. | Release Polymer | Anionic Monomer Used | Peel Force, N/m (oz/inch) | |
|---|---|---|---|---|
| | | | Initial | Aged |
| 69 | P12 | AA | 9.4 (0.85) | 51 (4.6) |
| 70 | P30 | MAA | 20 (1.8) | 104 (9.4) |
| 71 | P31 | BCEA | 16 (1.4) | 125 (11) |
| C24 | P32 | ICA | 46 (4.1) | 270 (24) |
| C25 | P33 | AMPS | 47 (4.2) | 230 (21) |
| C26 | P34 | SSS | 62 (5.6) | 280 (25) |
| C27 | P35 | PHOS | 62 (5.6) | 300 (27) |
| C28 | P36 | none | 43 (3.9) | 200 (18) |

The data in Table 11 show that release polymers derived from monofunctional carboxylic acid monomers produced the lowest peel force values. 5 EXAMPLES 72–74 AND COMPARATIVE EXAMPLES C29–C30

In Examples 72–74, treated papers were prepared and tested as in Example 1 using Kymene™ 557LX cationic primer and fluoroalkyl release polymer P14, each applied at 1.0% SOF from an Elvanol™ HV polyvinyl alcohol aqueous solution and cured at 77° C. (170° F.), 93° C. (200° F.), or 110° C. (230° F.)

In Comparative Examples C29–C30, a conventional, water-based, thermoset, silicone release coating was used to prepare coated papers using the simplified method of this invention as in Example 1. The primer coating used in these Comparative Examples was a 3% Elvanol™ HV polyvinyl alcohol aqueous solution containing no cationic primer. The release coating solution was prepared by diluting 0.5 g of PC-95™ platinum catalyst emulsion (available from Rhone-Poulenc) to 50 g with 3% Elvanol™ HV polyvinyl alcohol aqueous solution, then adding 5.0 g of PC-188™ high vinyl content silicone polymer emulsion (available from Rhone-Poulenc) and diluting the resulting mixture to 100 g with 3% Elvanol™ HV polyvinyl alcohol aqueous solution. The resulting mixture was coated onto paper at either 1.0% or 2.0% SOF and cured within 20 minutes of coating at 110° C. (230° F.).

3M Magic™ tape # 810 was used for all peel force measurements. Compositions and test results are summarized in Table 12.

TABLE 12

| Ex. | Cationic Primer | % SOF Release Polymer | Release Polymer Cure Temp. | Peel Force, N/m (oz/inch) | |
|---|---|---|---|---|---|
| | | | | Initial | Aged |
| 72 | Kymene™ 557LX | 1% | 77° C. | 12 (1.1) | 100 (9.0) |
| 73 | Kymene™ 557LX | 1% | 93° C. | 8.8 (0.79) | 41 (3.7) |
| 74 | Kymene™ 557LX | 1% | 110° C. | 7.9 (0.71) | 40 (3.6) |
| C29 | | 1% | 110° C. | 15 (1.4) | 120 (11) |
| C30 | | 2% | 110° C. | 4.8 (0.44) | 81 (7.4) |

The data in Table 12 show that the compositions of this invention performed well, even when cured at relatively low temperatures and applied at 1% SOF. Conventional silicone-based release papers need to be cured at high temperatures in order to produce coated papers with peel forces as low as the Examples of this invention.

EXAMPLE 75

Using a pilot scale paper machine size press, a release coating was applied in two passes to a paper base stock, of basis weight 59 g/m² (36 lb/3000 ft²), unsized and highly refined. For the first pass, Kymene™ 557LX cationic primer was applied from a 3% aqueous solution of Penford™ Gum 270 starch. For the second pass, silicone-based release polymer P2 was applied from deionized wetter. Several hundred meters of paper were coated, then dried at 135° C. (275° F.) over three dryer cans after each pass. Wet pick-up (percent weight gain) of the paper after the first and second passes was 30 and 23 percent respectively. Actual application amount for primer and release polymer was determined to be 0.53% SOF and 0.51% SOF respectively. Table 13 shows peel force values using permanent and rubber resin adhesive tapes.

TABLE 13

| | Peel Force, N/m (oz/inch) | |
|---|---|---|
| Tape Used | Initial | Aged |
| Magic™ Tape #810 | 10 (0.92) | 57 (5.2) |
| Zonis™ Tape | 50 (4.5) | 130 (12) |

The data in Table 13 show that the two-part release system of Kymene™ 557LX cationic primer and silicone-based release polymer P2 exhibited low peel force values when evaluated with either permanent acrylate or rubber resin based adhesive tapes.

EXAMPLES 76–80

In Examples 76–80, readhesion of adhesive tapes following contact with the coated paper of this invention was determined. Treated papers were prepared as described above by first applying Kymene™ 557LX cationic primer at 1.0% SOF from a 3% Elvanol™ HV aqueous solution. Release polymers P1, P7, P10, P12, or P14 were then applied at 1.0 or 2.0% SOF from a 3% Elvanol™ HV aqueous solution to prepare treated papers of this invention. 3M Magic™ Tape 810 was dry-laminated to the treated paper and aged at 65° C. (150° F.) for 2 days as described above. After completion of the aged peel force test, the tape which was removed from the release liner of this invention was dry-laminated to a clean glass plate using one pass of a 2 kg rubber roller. The peel force required to remove the aged tape from the glass was measured using the IMASS™ peel tester described above. This adhesion to glass test was repeated using a fresh piece of 3M Magic™ Tape # 810. The "percent readhesion" was calculated by dividing the peel force from the aged tape by the peel force from the fresh tape and multiplying by 100. The release polymer used in the aged peel force test, the % SOF of the release polymer, and the percent readhesion are summarized in Table 14.

TABLE 14

| Release Polymer | % SOF Release Polymer | % Readhesion |
|---|---|---|
| P1 | 2.0 | 86 |
| P7 | 1.0 | 86 |
| P10 | 2.0 | 69 |
| P12 | 1.0 | 89 |
| P14 | 1.0 | 93 |

The data in Table 14 show that the treated papers of this invention, including release polymers containing silicones, fluoroacrylates, or fluorochemically modified silicones, provided good release to adhesive tapes and did not significantly reduce the adhesion of the adhesive tape even after aging in contact with the treated papers of this invention.

Various modifications and alterations of this invention will become apparent to those skilled in the art without departing from the scope and spirit of this invention.

What is claimed is:

1. A method for preparing treated cellulosic substrate comprising the steps of A) first applying a water-based primer coating comprising a water-soluble or water-dispersible cationic polymer to a cellulosic substrate, followed by B) applying a water-based release coating comprising a water-soluble or water-dispersible release polymer comprising pendant carboxyl or carboxylate functional moieties, wherein said release polymer provides improved release properties to the surface of the treated substrate.

2. The method of claim 1 wherein said substrate is paper.

3. The treated substrate of claim 1 wherein said primer coating, said release coating, or both further comprises a water-soluble film-former.

4. The method of claim 1 wherein said release polymer comprises interpolymerized units derived from acrylic acid.

5. The method of claim 1 wherein said release polymer comprises fluoroalkyl-containing or fluoroalkylene-containing hydrophobic groups.

6. The method of claim 1 wherein said release polymer comprises organopolysiloxane-containing hydrophobic groups.

7. The method of claim 1 wherein said release polymer comprises long-chain hydrocarbon-containing hydrophobic groups.

8. The method of claim 2 wherein said applying steps are carried out on a papermaking machine.

9. Treated paper wherein at least one surface of said paper has been coated by A) first applying a water-based primer coating comprising water soluble or water-dispersible cationic polymer followed by B) applying a water-based release coating comprising a water-soluble or water-dispersible release polymer comprising pendant carboxyl or carboxylate functional moieties.

10. The treated paper of claim 9 further comprising an adhesive coating on the surface opposite said surface comprising said primer coating and release coating.

11. The treated paper of claim 10 wherein said adhesive is a tacky and pressure-sensitive adhesive.

12. A stack of superimposed paper sheets of the treated paper of claim 11 wherein the adhesive of each successive sheet being in contact with the release coating of an immediately preceding sheet.

13. The treated paper of claim 10 wound convolutely on itself about a core to form a roll.

14. The treated paper of claim 9 wherein said primer coating and release coating cover a first portion of said surface and a normally and pressure-sensitive adhesive covers a second portion of the same surface as said primer coating and release coating.

15. The treated paper of claim 14 wherein said paper is generally rectangular in shape having long edges, and wherein said primer coating and release coating are present in a band adjacent to one of the long edges and said adhesive is present in a band adjacent to the other long edge.

16. The method of claim 1 wherein said primer coating, said release coating, or both contain 10% or less by weight organic solvent.

\* \* \* \* \*

UNITED STATES PATENT AND TRADEMARK OFFICE
CERTIFICATE OF CORRECTION

PATENT NO. : 5,492,599
DATED : February 20, 1996
INVENTOR(S) : Christopher C. Olson; Ramesh C. Kumar, John C. Chang, It is certified that error appears in the above-identified patent and that said Letters Patent is hereby corrected as shown below:

Column 5, line 40 "(0,315g)" should be -- (0.315 g) --

Column 8, line 25 "base( on fiber)" should be -- based on fiber --

Column 13, line 13 "M Magic" should be -- 3M Magic --

Column 14, line 38 "solution 3M Magic" should be -- solution. 3M Magic --

Column 14, line 57 "5" should be deleted

Column 14, line 57 and 58 "'EXAMPLES 72-74 AND COMPARATIVE EXAMPLES C29-C30" is a title and should be centered on line 58.

Column 15, line 48 "wetter" should be "water" --

Column 18, line 9 "normally" should be -- tacky --

Signed and Sealed this

Fourteenth Day of September, 1999

Q. TODD DICKINSON

Attest:

Attesting Officer

Acting Commissioner of Patents and Trademarks